April 12, 1960   C. VAN DER LELY ET AL   2,932,148
ROTARY RAKING WHEEL
Original Filed Nov. 9, 1953   2 Sheets-Sheet 2
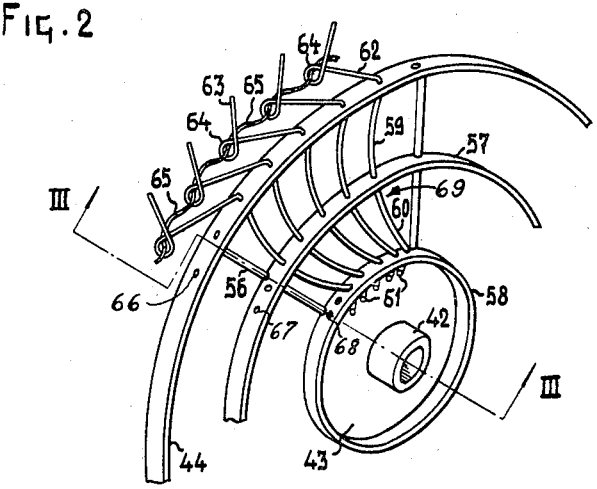
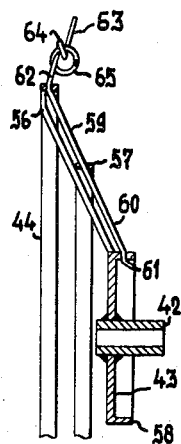
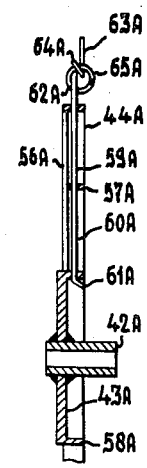

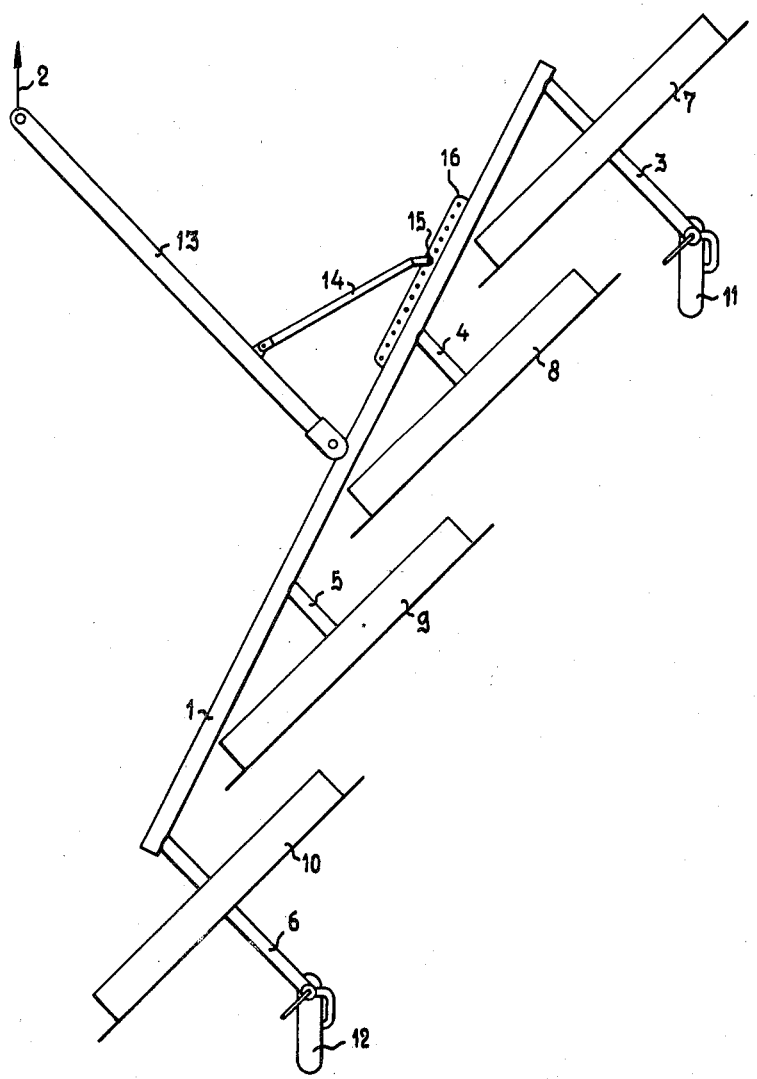

United States Patent Office

2,932,148
Patented Apr. 12, 1960

2,932,148

ROTARY RAKING WHEEL

Cornelis van der Lely and Ary van der Lely, Maasland, Netherlands, assignors, by mesne assignments, to C. van der Lely Canada Ltd., Ottawa, Ontario, Canada, a corporation of Canada Original application November 9, 1953, Serial No. 390,981, now Patent No. 2,860,478, dated November 18, 1958. Divided and this application October 13, 1958, Serial No. 766,963

11 Claims. (Cl. 56—377)

This invention relates to raking members, and more particularly to raking members for use in raking devices having a mobile frame and a substantially horizontal axle upon which one or more raking members are mounted at an angle to the direction of movement of the frame. The raking members in such devices are rotated by their contact with the ground and rakable substance during movement of the mobile frame. The periphery of each raking member has teeth for moving rakable substance over the ground, such teeth being mounted to permit their deflection when the teeth are under a load.

In existing raking devices of this kind, means are provided which permit variation of the elevation of the axle carrying the raking member in its relation to the frame. For example, the axle may be formed by the crankpin of a crank rotatably mounted on the frame. The use of such an arrangement in a device having a plurality of raking members arranged in a row will permit the raking members to adjust themselves individually with respect to elevation so that a raking member is adaptable to substantial unevenness in the terrain. Existing devices depend upon deflection of the circumferential teeth of the raking members for their adaptation to small irregularities or unevenness in the terrain. However, when the teeth of existing raking members undergo even a relatively small deflection, their ability to displace the substance lying on the ground in the desired direction is diminished or lost as the deflected teeth become less vertical in their position and tend to drag over the rakable substance.

Accordingly, an object of this invention is to provide raking members or raking wheels particularly adapted for use on a raking device as described and having teeth capable of a high degree of deflection without losing or diminishing their ability to carry along the rakable substance.

A further object of the invention is to provide a rake wheel with raking teeth mounted in a simple manner and capable of very favorable resilient deflection.

In accordance with the invention, the above objective is realized by providing means which retain the teeth of the raking member in favorable positions to perform their raking function, whether the teeth are in a normal condition or in a substantially deflected condition.

The foregoing characteristic in raking wheels embodying this invention results in the following advantages:

(a) The raking wheels provide a more efficient raking operation resulting in a smaller loss of the rakable substance or material since less material will remain on the ground following passage of the raking device;

(b) Very uneven terrain may be worked effectively;

(c) The raking device requires a smaller number of raking members or wheels for the same width than normally necessary in conventional raking members and as a result is less expensive; and (d) The axles of the raking members may be rigidly secured to the frame of the raking device since the adaptation of the raking members to the contours of the ground can be effected solely by deflection of the teeth, rather than by bodily displacement of the raking members as heretofore.

Still further objects, features, advantages and details of the present invention will appear in the following description which is to be read in connection with the accompanying drawings in which various embodiments of the invention have been illustrated by way of example.

This is a division of our application filed November 9, 1953, Serial No. 390,981, now Patent No. 2,860,478.

Figure 1 is a top plan view of a raking device of the kind on which raking members embodying the present invention are to be used.

Figure 2 is a fragmentary perspective view of a raking member constructed in accordance with this invention.

Figure 3 is a view of the raking member shown in Figure 2 through section line 3—3 in Figure 2.

Figure 4 is a view similar to Figure 3, but illustrating a modification of the raking member shown in Figure 2.

Referring to the drawings in detail and initially to Figure 1, a side delivery rake of the kind on which raking members constructed in accordance with the present invention are to be employed, there is shown a frame formed by an elongated beam 1 extending obliquely with respect to the normal direction of movement of the device, as indicated by the arrow 2. Four parallel axles 3, 4, 5 and 6 are rigidly secured to the beam 1 and extend therefrom substantially horizontally. The axles 3, 4, 5 and 6 carry rotatable raking members 7, 8, 9 and 10, respectively. The end axles 3 and 6 carry running wheels 11 and 12 which support the frame and maintain the latter at a predetermined elevation above the ground. The wheels 11 and 12 are preferably self-adjusting or swivel wheels which may, if desired, be locked in any position. An adjustable draw arm 13 is hingedly connected to the beam 1 permitting an arc of movement relative to the latter in a substantially horizontal plane. The arm 13 may be locked in any desired angular position relative to the beam 1 by means of a rod 14, which at one of its ends, is hingedly connected to the arm 13 and has an aperture 15 at its free end. The rod 14 may be arranged with its aperture 15 above any of the corresponding apertures provided in member 16 secured to the beam 1. Thus the rod 14 may be secured in a position by means of a pin or bolt extending through the aperture of the rod 14 and the aligned aperture of member 16.

In the raking member shown in Figures 2 and 3, an outer rim 44 with a number of apertures 66 radially therethrough is rigidly connected to a disc 43 by means of spokes 56. The spokes 56 further carry an intermediate rim 57 which is provided with the same number of apertures 67 as the rim 44. The disc 43 has attached thereto a flange 58 adjacent its periphery which is also provided with the same number of apertures 68 as the rim 44. A steel wire is introduced into each group of three apertures, each group being made up of one aperture 66 in the outer rim 44, an aperture 67 in the intermediate rim 57, and an aperture 68 in the flange 58. However said three apertures are not in radial alignment and the steel wire through the said three apertures is therefore not straight but is bowed as shown in Figure 2.

The part 59 of the steel wire or resilient rod 69 which is located between the outer rim 44 and the intermediate rim 57 is a torsion means which defines the axis for the arc movement of the related tooth 63, while the part 60 of the wire between the intermediate rim 57 and the flange 58 may be considered as an arm tending to keep the torsion means 59 in a definite position. The inner end 61 of the steel wire 69 is bent at approximately a right angle at the radially inner side of flange 58 in order to prevent a removal of the inner end 61 of the wire 69 through the related aperture in the flange. The torsion means 59 extends through the outer rim 44 and the steel wire 69 is then bent so as to form a supporting member 62 for the tooth 63, the supporting member 62 being disposed substantially at right angles to the related torsion means 59. The steel wire 69 (from which the parts 59, 60, 62 and 63 are all formed) includes, between the supporting members 62 and the tooth 63, a loop 64 with which the wire engages an endless steel wire helical spring 65 having a large pitch. As a result of this arrangement, and apart from the elastic deformation of the spring 65 and other small or negligible displacements, the distance between the loops 64 of successive wires remains about equal to the pitch of the helical spring 65.

It will be noted from Figure 3 that the raking member is disposed laterally with the hub 42 being forward of the rim 44 and with the spokes 56 and the intermediate rim 56 and flange 58 spaced in distinct but parallel planes between the hub 42 and the rim 44, the flange 58 lying forward of the intermediate rim 57.

In the claims, rim 44 and the parts with the rim 44 including the hub 42, disc 43, spokes 56, intermediate rim 57 and parts 59 and 60 of steel wire 69 comprise a central portion of the raking member. Further, it is to be noted that in the illustrated embodiment parts 59 and 60, supporting member 62, and tooth 63 comprise a first portion, second portion, and a third portion, respectively, of a resilient rod.

In the embodiment of Figure 4, wherein the various parts are identified by the same reference numerals employed in connection with the corresponding parts in Figures 2 and 3, but with the letter A appended thereto, the various parts of the raking members of Figure 4 are all disposed in substantially one radial plane. Thus, in Figure 4, the rims 44A and 57A, the torsion means 59A, the securing portions 60A, the supporting members 62A, the spokes 56A, the flange 58A, the loops 64A, and the helical spring 65A are all disposed in the radial plane passing through the disc 43A of the raking member.

The raking members illustrated in the drawings present supporting members for the teeth which are directed forward in the direction of rotation. However, it is also possible to have the supporting members directed backwards. It will be understood that the supporting members need not be rectilinear. A curved form may be advantageous in certain cases. Numerous other variations in the described construction are possible.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:
1. A raking member comprising a hub rotatable about an axis, an outer rim member having radial openings therethrough, said outer rim member being spaced outwardly from said hub and substantially concentric therewith, an intermediate rim member having radial openings therethrough, spaced between said hub and said outer rim member and substantially concentric therewith, spokes rigidly connecting said hub with said rim members, resilient rods each having a first portion extending through an opening in said intermediate rim member and also through an opening in said outer rim member, said resilient rods each having a second portion on the outside of said outer rim member extending substantially normally to said first portion, and said resilient rods each having a third raking portion extending outwardly from said second portion.

2. A raking member according to claim 1 wherein said radial openings in said outer rim members are radially unaligned with said radial openings in said intermediate rim members.

3. A raking member comprising a hub rotatable about an axis, an outer rim member, an intermediate rim member, resilient rods attached to said hub and each having a first portion, with an initial part extending to said intermediate rim member and a succeeding part extending from said intermediate rim member to said outer rim member, said resilient rods each having a second portion extending substantially normally to said first portion, said resilient rods each having a third portion comprising raking teeth extending outwardly from said second portion which together with said first portion provide torsion means for said third raking portion.

4. A raking member comprising a hub rotatable about an axis, a disc rigidly attached thereto and substantially concentric therewith, an intermediate rim member having radial openings therethrough spaced from said disc and substantially concentric therewith, an outer rim member having radial openings therethrough spaced from said intermediate rim member and substantially concentric therewith, spoke means rigidly interconnecting said disc, said intermediate rim member and said outer rim member, resilient rods attached to said disc and each having a first portion with an initial part extending from said disc through an opening in said intermediate rim member and a succeeding part extending from said intermediate rim member through an opening in said outer rim member, said resilient rods each having a second portion on the outside of said outer rim member extending substantially normally to said first portion, and said resilient rods each having a third raking portion extending outwardly from said second portion.

5. A raking member according to claim 4 wherein said disc incorporates a flange part at its periphery, said flange part having a radial opening therethrough, the inward part of said first portion of said resilient rods extending through said openings in said flange part of said disc and being movably secured thereto.

6. A raking member according to claim 4 wherein the parts of said resilient rods formed of the initial and succeeding parts of said first portions thereof are bow-shaped.

7. A raking member comprising a wheel having a hub, a peripheral rim, an intermediate rim spaced between said hub and said peripheral rim and rigidly connected to each, a resilient supporting member operatively associated with said peripheral rim and extending outwardly at an angle to a radius at the point of association with said peripheral rim, a raking tooth extending substantially normally to a terminal portion of said supporting member and outwardly with respect thereto, a torsion means for said supporting member extending inwardly from the point of association of said supporting member and being connected to said intermediate rim.

8. A raking member comprising a central portion, said central portion having a plurality of resilient rods operatively associated therewith, each of said rods having a curved first portion operatively associated within said central portion at at least three locations which are unaligned, said resilient rods each having a second portion on the outside of said central portion extending substantially tangentially therefrom and a third raking portion extending outwardly from said second portion.

9. A raking member comprising: a central portion having a hub rotatable about an axis, an intermediate rim member, an outer rim member, and spokes interconnecting said hub and said rim members; at least one resilient rod having a portion secured to said central portion and extending to said intermediate rim member, said rod having a further portion extending outwardly from said intermediate rim member to said outer rim member, said rod having a supporting portion extending outwardly from said outer rim member, and said rod further having a raking tooth extending outwardly from said supporting portion.

10. A raking member comprising: a central portion having a hub rotatable about an axis, a rim member, rod securing means disposed between said hub and said rim member, and spoke means interconnecting said hub, said rim member and said rod securing means; at least one resilient rod secured at at least three unaligned locations in said central portion, at least one portion of said resilient rod comprising supporting means for a raking tooth extending outwardly from said rim member, and a further portion of said resilient rod comprising said raking tooth extending outwardly at an angle from said resilient rod's first mentioned portion.

11. A raking member comprising a central portion, a plurality of resilient rods, each of said rods having a first portion and a second portion, a raking tooth mounted on each of said second portions, the first portion of each rod being within and constituting a part of said central portion and each of said first portions being curved and movably secured in said central portion at three separate radially and circumferentially spaced locations.

References Cited in the file of this patent

UNITED STATES PATENTS

| | | |
|---|---|---|
| 2,588,599 | Winter | Mar. 11, 1952 |
| 2,851,846 | Van der Lely | Sept. 16, 1958 |

OTHER REFERENCES

Information Circular #4, North Carolina State College, May 1951.